E. H. EHRMAN.
BALL JOINT.
APPLICATION FILED AUG. 2, 1912.

1,185,784.

Patented June 6, 1916.

Witnesses
Robert H. Weir
Arthur B. Framke.

Inventor
Edwin H. Ehrman,
by Jno. E. Waldo,
Atty.

UNITED STATES PATENT OFFICE.

EDWIN H. EHRMAN, OF OAK PARK, ILLINOIS, ASSIGNOR TO THE CHICAGO SCREW COMPANY, OF CHICAGO, ILLINOIS, A CORPORATION OF ILLINOIS.

BALL-JOINT.

1,185,784.     Specification of Letters Patent.     Patented June 6, 1916.

Application filed August 2, 1912. Serial No. 712,918.

*To all whom it may concern:*

Be it known that I, EDWIN H. EHRMAN, a citizen of the United States, and a resident of Oak Park, in the county of Cook and State of Illinois, have invented a certain new and useful Improvement in Ball-Joints, of which the following is a specification.

This invention relates to ball joints and relates particularly to ball joints of the familiar type comprising a socket member provided with a slot which opens through the side wall of the socket therein, and a ball member, the ball of which is fitted to turn freely in suitable bearings formed in bearing blocks or members in the socket of said socket member, and a shank on said ball member which projects through the slot in said socket member.

The object of the present invention is to simplify and cheapen the construction of ball joints of this type while providing adequate strength. To effect this object, a ball joint of my invention comprises the various features and details of construction hereinafter described and claimed.

Figure 1:
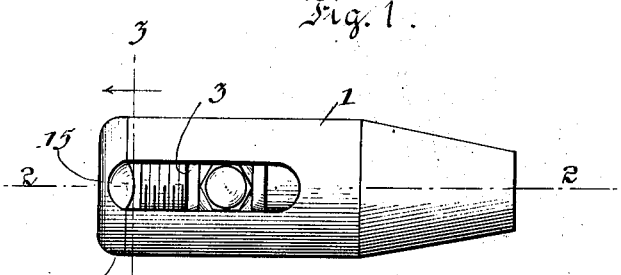
Figure 2:
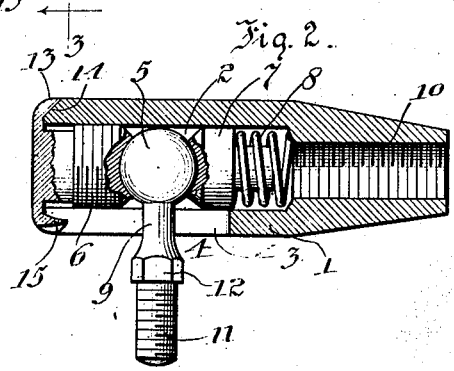
Figure 3:
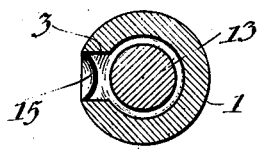

In the accompanying drawing, in which my invention is fully illustrated, Figure 1 is a side view of a ball joint of my invention; Fig. 2 is a sectional plan view on the line 2—2 of Fig 1; and Fig. 3 is a sectional view on the line 3—3 of Fig. 1.

Referring now to the drawing, 1 designates the socket member of a ball joint of my invention, formed in which is the usual socket 2, the wall of which is slotted at one side, as shown at 3, 4 designates the ball member, the ball 5 of which is fitted to turn freely in suitable bearings formed in the opposed ends of bearing blocks or members 6 and 7, of which the member 6 is screw-threaded into the outer end of the socket 2, and the member 7 is slidably fitted to the socket 2, the bearing in said member 7 being maintained in engagement with the ball 5 by a spring 8 inserted between said member and the bottom of the socket 2. The shank 9 of the ball member 4 projects through the slot 3 in the socket member 1.

To provide for securing the ball joint members 1 and 4 to the respective parts designed to be connected thereby, the socket member 1 is provided with a screw-threaded hold or opening 10 in the end thereof opposite to that in which the socket 2 is formed, and the outer end of the shank 9 of the ball member 4 is screw-threaded, as shown at 11, said shank 9 comprising a flat-sided, preferably hexagonal, section 12, to provide for engaging a wrench therewith for turning said ball member to engage the screw-threaded end thereof with the correspondingly screw-threaded hole in the part to which it is to be secured.

Excepting as hereinafter particularly pointed out, all of the foregoing parts are old and well known, and will be readily understood by persons familiar with the art without a detailed description thereof.

In accordance with my invention, the slot 3, instead of being closed at its outer end, in the manner heretofore common, "cuts out" at the end of the socket member 1 into which the bearing member 6 is threaded. Spreading or springing of the slotted end of said socket member 1 is prevented by means of a flange 13 formed on the screw-threaded bearing member 6, which interlocks with a rigid shoulder or part of said socket member 1. In the preferable construction shown, said flange 13 interlocks with an inclined or beveled surface 14 formed at the end of said socket member 1. After said bearing member 6 is fully seated, it is designed to be locked so as to prevent unscrewing and loosening thereof. Simple means for this purpose consists in swaging the edge of the flange 13 of said bearing member 6 which extends across the slot 3 inwardly into engagement with said slot, as shown at 15, said inwardly struck or swaged part 15 of said flange thus forming in effect a tongue which interlocks with the sides of said slot 13 and which will operate in an obvious manner to prevent turning of the member 6 in the manner desired. Other means for preventing unscrewing of said bearing member 6 will readily suggest themselves to expert mechanics, and I do not therefore desire to limit myself to the particular locking means shown and particularly described.

I claim:—

1. A ball joint comprising a socket member provided with a socket and with a slot which extends through the side wall of said socket member and "cuts out" at the end thereof, bearing members confined in said socket member comprising a spring pressed inner bearing member and an outer bearing member threaded into the end of said socket member, and means unitary with said outer bearing member and coöperating with rigid parts of said socket member to strengthen and stiffen the slotted end of said socket member and to prevent unscrewing of said outer bearing member, substantially as described.

2. A ball joint comprising a socket member provided with a socket and with a slot which extends through the side wall of said socket member and "cuts out" at the end thereof, a bearing member threaded into the end of said socket member and having a flange which interlocks with a rigid part of the socket member to stiffen and strengthen the slotted end of said socket member, and said flange also being interlocked with the slot in said socket member to prevent unscrewing of said screw-threaded bearing member, substantially as described.

In testimony that I claim the foregoing as my invention, I affix my signature in presence of two subscribing witnesses this 27th day of July, A. D. 1912.

EDWIN H. EHRMAN.

Witnesses:
S. J. DORAIS,
MARY H. BIXEL.